Feb. 24, 1953 F. P. WARRICK 2,629,646
SHUTTERLESS RECORDING OSCILLOGRAPHIC CAMERA
Filed April 2, 1947 2 SHEETS—SHEET 1
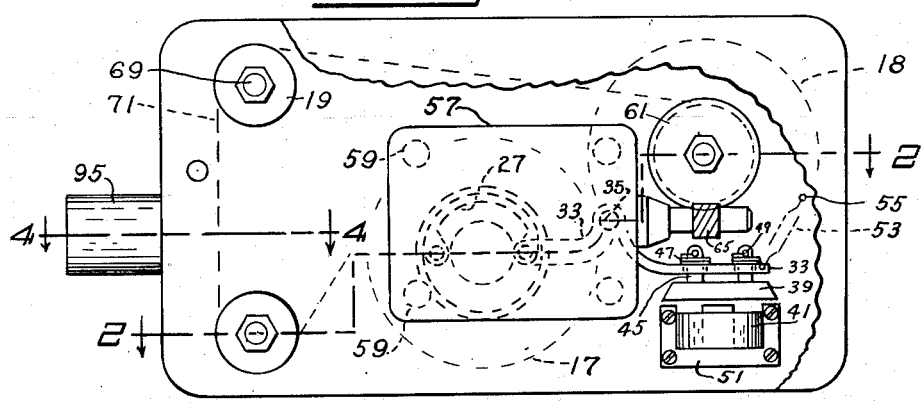
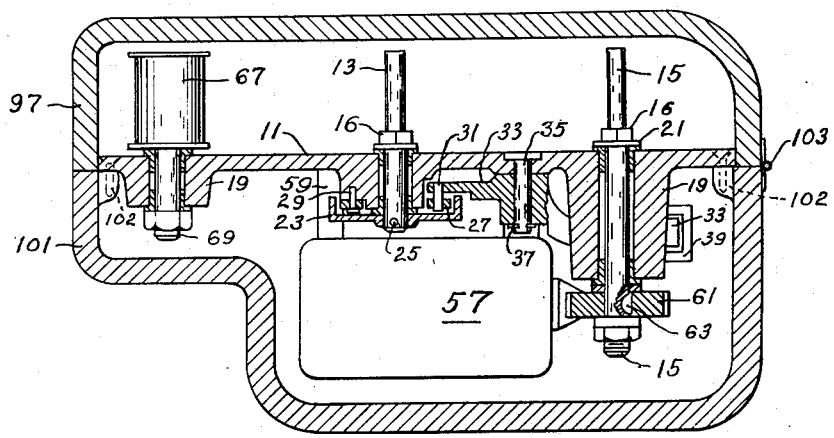
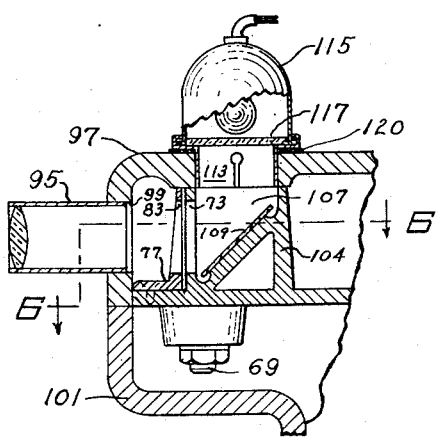
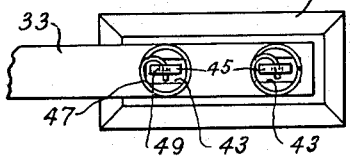
INVENTOR
FREDERICK P. WARRICK
BY
F. T. Hicks
ATTORNEY

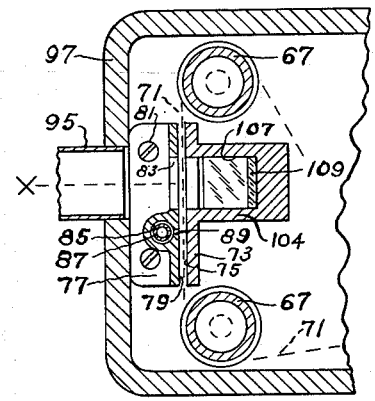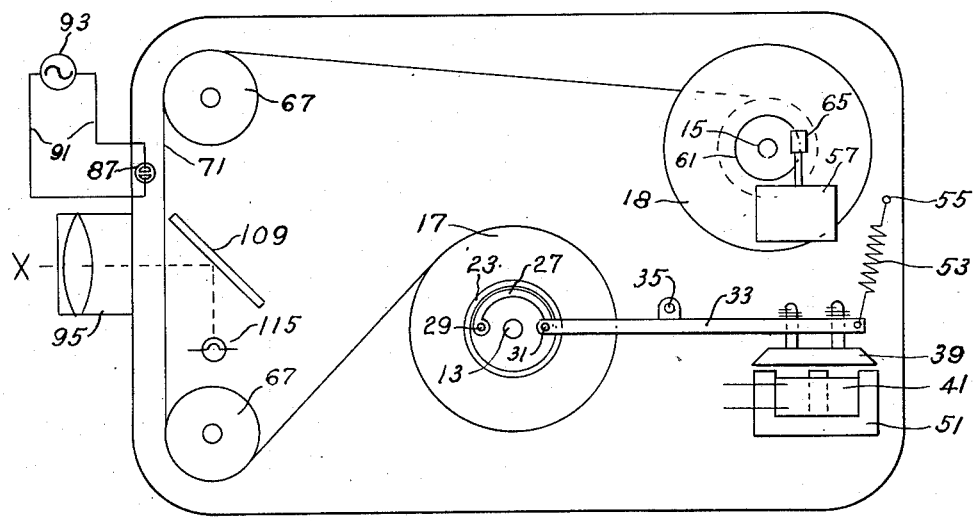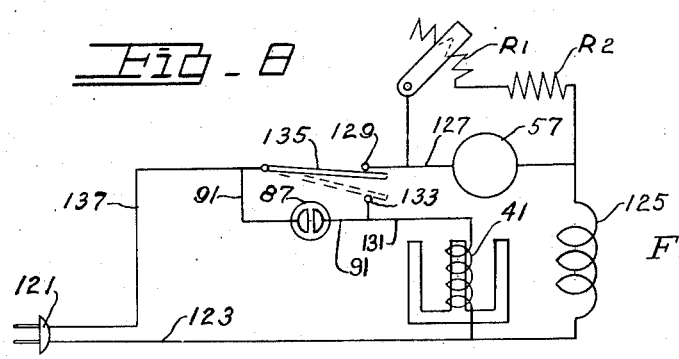

Patented Feb. 24, 1953

2,629,646

UNITED STATES PATENT OFFICE 2,629,646

SHUTTERLESS RECORDING OSCILLO-
GRAPHIC CAMERA

Frederick P. Warrick, Detroit, Mich.

Application April 2, 1947, Serial No. 738,855

5 Claims. (Cl. 346—108)

The invention pertains to a high speed oscillographic recording camera and controls therefor.

It is an object of the invention to provide an improved oscillographic camera for operation at high speeds to record transient phenomena.

It is also an object of the invention to provide a high speed oscillographic camera with improved electrical operation and control means.

It is a further object of the invention to provide in such a camera an improved drive arrangement for quickly starting the film and bringing it up to full speed.

Another object of my invention is to provide a high speed recording camera having an arrangement for holding the film taut while unreeling it and drawing it continuously past the window.

In accordance with my invention, I provide a high speed recording camera which differs substantially from the common motion picture camera in that it utilizes the full cross-sectional strength of the film for quick starting, there being no sprocket teeth, and also the film is moved continuously instead of intermittently. Further objects and advantages are within the scope of the invention, such as relate to the arrangement, operation and function of the related elements of the structure, to various details of construction and to combinations of parts, elements, per se, and to economies of manufacture and numerous other features, as will be apparent from a consideration of the specification in conjunction with the drawings disclosing specific embodiments of the invention, in which:

Fig. 1 is a side elevational view showing the motor side of the camera with the housing partially broken away;

Fig. 2 is a sectional view on line 2—2 in Fig. 1;

Fig. 3 is an enlarged fragmentary plan view showing the end of the brake actuating lever;

Fig. 4 is an enlarged fragmentary sectional view on line 4—4 in Fig. 1, for showing the projection mirror in its relation to the film and the projection lamp inserted into the camera;

Fig. 5 is an inner side elevational view showing the cap which is normally inserted in place of the projector lamp;

Fig. 6 is a sectional view on line 6—6 in Fig. 4;

Fig. 7 is a diagrammatic view illustrating the operation of the camera; and

Fig. 8 is a diagram schematically showing the electrical system of connections.

Referring more specifically to the figures of the drawings, it will be seen that my recording camera comprises a light weight base plate 11 wherein is rotatively journalled a supply reel support or spindle 13 and a drawing reel support spindle 15. These reel supports project suitably from the base plate and are provided with square shanks 16 adjacent the base plate for receiving and holding film reels 17 and 18 (represented dotted) in a manner commonly provided in motion picture apparatus. The opposite side of the base plate is provided with suitable bearing bosses 19 providing bearings in which these spindles are rotatively supported and the spindles are provided with shoulders 21 at the ends of the square shanks 16, to take the thrust by abutting the adjacent base plate and bearings. Although plain bearings are shown, it is to be understood that conventional friction reducing ball or roller bearings may be utilized, if desired. The base plate 11 is preferably made of some light weight metal such as aluminum, magnesium, or alloy, providing a rigid light weight structure.

For holding the supply reel 17 firmly when the apparatus is not in operation and for stopping it quickly at the end of an operation, the supply reel support spindle 13 extends through its bearing to receive a brake drum 23 secured firmly thereon, as by a pin 25, with the brake drum turned in a compact arrangement toward the base. Inside of the brake drum 23 I provide a brake shoe 27, which is of a substantially arcuate semicircular shape for fitting up against the inner surface of the brake drum, and one end of which is pivotally supported by a pin 29 inserted snugly into the boss 19 of the base plate. The other end of the arcuate brake shoe is apertured to loosely receive a pin 31 projecting from one end of a brake lever 33 which is pivotally supported upon a pin 35 extending through the base plate into an intermediate portion of the lever. The end of the bearing pin 35 is preferably provided with a resilient clip 37 to hold the brake lever in place on the bearing pin. The other end of the brake lever 33, which may be curved downwardly for a compact assembly, carries an armature plate 39 adjacent an electromagnet 41 by which the brake is controlled, in a manner to be subsequently set forth. As may be seen more clearly in Fig. 1, and in Fig. 3, enlarged, this end of the brake lever 33 is preferably provided with a pair of apertures 43 for loosely receiving a pair of lugs 45 projecting up therethrough from the armature 39. Around the upward projecting end of each lug 45 a coiled compression spring 47 is provided resting upon the upper side of the brake lever. The upper end of each coil spring 47 is inserted into a hole 49 in the upper end of each armature lug 45. When the electromagnet winding 41 is energized, its field structure 51, which is preferably of an E shape with the winding on the middle leg, draws the armature 39 and pulls down the connected end of the brake lever 33 thus lifting the connected end of the brake shoe and applying the brake. A tension spring 53 is preferably provided, connected between the end of the brake lever and any stationary anchor pin 55 in the base, for pulling up the adjacent end of the brake lever to quickly release the brake, when the electromagnet has been deenergized.

The drawing reel spindle 15 is extended through its bearing in the base plate for connection with a suitable driving source of power or motive means 57. For this purpose, I find it advantageous to provide a constant power type of motor and a motor which has proven to be satisfactory is a universal alternating current and direct current commutator type of electric motor. This motor is mounted on brackets or bosses 59 projecting from the base. Spiral or worm wheel 61 is secured firmly on the projected end of the drawing reel spindle, as by a key 63, and it is driven by a worm 65 on the motor shaft. Such a motor has a very high speed and the gear reduction provides a greater starting torque than would be obtained with a direct drive and the high speed operation of the motor moves the film at high speed. The operation and control of the motor is accomplished in a manner to be more fully disclosed subsequently.

A pair of flanged idler pulleys 67 are suitably mounted, as by shafts 69 in bearings in the base, for guiding a film 71 to traverse a certain predetermined path adjacent one end of the base. Between these two idler pulleys 67 a fixed gate arrangement is provided for still further guiding the movements of the film and as may be seen in Figs. 4 and 6, this comprises a rigid flange 73 projecting integrally from the base and presenting a straight outwardly facing guide surface 75. A gate flange 77 of a generally L-shaped cross-section, having a straight guide surface 79, is secured to the base, as by screws 81, so that the two straight guide surfaces are suitably spaced apart. A window aperture 83 is provided in the gate flange 77 for admitting a projected ray (shown dotted) to impinge upon the film as it passes through the guide gate. Also this gate flange is provided with an aperture 85 for receiving a timing lamp 87, which may be a neon, argon, or other gas filled discharge lamp. As shown in Fig. 6, a small recess 89 opens from the lamp aperture 85 into the guide gate space adjacent one edge of the film so that, by flashing the lamp, timing marks may be accurately calibrated upon the light sensitive film, and it is not necessary to know the exact speed of movement of the film in order to be able to accurately interpret the record made thereon. Energizing wires 91 extend from the timing lamp for connection with any alternating current electrical energy source 93 of known frequency—which may merely be the usual service mains, or which may be a source especially provided for this purpose.

As the continuously moving film provides one axis i. e. the time axis, the ray projected upon the film may be merely light reflected from a mirror of a galvanometer type oscillograph, and for such purposes a lens would not be necessary. But for observing high speed transient phenomena a high speed instrument is necessary, such as a cathode ray type of oscilloscope for example, and the camera is accordingly provided with an optical system 95 for projecting an image thereof upon the moving film. As with most cameras, it is desirable to utilize the instrument away from the dark room, so an enclosing cover 97 is provided fitting around the edges of the base and having a suitable window opening 99 supporting the lens in alignment with the window 83 in the gate flange 77, as seen in Fig. 4. A housing 101 is also preferably provided for enclosing the other side of the base to protect the motor and brake mechanism from dust and foreign matter. The housing fits around the edges of the base to which it is firmly secured, as by screws 102, and the cover is preferably attached at one end, as by a hinge 103 so that it can be conveniently swung open to provide access for loading or unloading film in the camera, seen in Fig. 2. The other end of the cover may be secured, as by an interlocking retainer, or any suitable resilient retainer may be utilized, as will be understood.

For convenience in utilizing the same apparatus for viewing or projecting a finished film, I also provide by the flange 73, wall means 104 integral with the base and defining a light projecting aperture opening into a chamber 107 wherein a light projecting mirror or reflector 109 is mounted. As Fig. 4 shows, the enclosing cover 97 at the side of the chamber away from the base is provided with a socket or opening suitably for receiving the end 113 of an accessory projector lamp 115 and the mirror 109 is inclined suitably for throwing the light upon the film, either for direct viewing or for enlarged projection upon a screen. The projection lamp 115 is a small casing supporting a conventional incandescent electric light bulb and preferably having its insertable end 113 split so that it will fit and hold snugly into the chamber socket on the camera cover 97. In the projection end of the lamp casing 115 a diffusing screen or condensing lens 117 is inserted for effectively distributing the projected light. The light-proof cover 97 has an opening of proper size in alignment with the chamber so that the projector lamp may be conveniently inserted. When the projector lamp is removed from the camera, this opening is closed by a cap 119, as shown in Fig. 5, which also similarly fits snugly into this opening and which is so installed while the camera is in normal operation. A gasket 120 of black felt, or like, excludes light.

Fig. 7 diagrammatically represents the operative elements of the camera, and Fig. 8 schematically represents the wiring connections for operating and controlling the high speed oscillographic camera to make a record of a transient phenomena as manifested by some projected ray, represented by a dotted line from a source X which may be a cathode ray or other suitable translating device. The camera may be energized from any suitable source from a convenient plug-in plug 121 through a conductor 123 connecting to one terminal of the brake electromagnet 41 and to one end of the series field winding 125 of the motor. The other end of the field winding 125 of the motor connects to one side of the motor armature, in the well known manner, from the other side of which a conductor 127 extends to one stationary contact 129 of a manual control snap action switch or push button. From the other terminal of the brake electromagnet 41 a conductor 131 connects to a second stationary contact 133 on the control switch, which has a movable blade 135 which can be quickly moved to engage either one of the fixed contacts. From this movable blade 135 another conductor 137 connects into the plug 121, and hence to the other side of the energizing source. If this is an alternating current source of suitable frequency, the timer flashing lamp conductors 91 may also be connected thereto. For controlling the operating characteristics of such a motor, a variable resistor R1 is preferably connected in shunt with the armature, although for safety a fixed resistor R2 is also preferably included in series with the variable resistor.

In operation, the supply reel 17 having been provided in the camera with a roll of suitable light sensitized film threaded through the fixed guide gate and around the guide pulleys, to the drawing reel 18, the motor M is started by snapping the control switch blade 135 to its full line position. Figs. 7 and 8, taken together, make the operation clear and show how this releases the brake and starts the motor. A quick start is made because of the characteristics of the motor and the worm reduction. As the film moves along at high speed through the fixed gate guide arrangement, the flashing timer lamp 87 makes accurate timing calibrations on the film. Also the worm reduction and the brake, with such a manual control, provide for quick stopping so that the roll of film may be utilized for recording several different phenomena. As film unreels from the supply reel 17, this reel will continue to accelerate due to the decreasing radius of the roll of film on this reel. This continued acceleration provides a drag and maintains tension to hold the film taut. Very quick starting up to high speeds is obtained because the full cross-sectional strength of the film is utilized rather than sprockets in holes in the film.

It is apparent that within the scope of my invention modifications and different arrangements may be made other than herein disclosed, and the present disclosure is illustrative merely, the invention comprehending variations thereof.

What is claimed as the invention is:

1. In combination in a high speed shutterless oscillographic recording camera, supply reel rotative support means for receiving and rotatively supporting a film supply reel with photo film thereon, drawing reel rotative support means for receiving and rotatively supporting a drawing reel, recording ray proof means having a recording ray transmitting area and forming a housing enclosing and mounting said reel supporting means spaced apart in a suitable cooperative relation, guide means for guiding film to traverse a predetermined path therein adjacent said recording ray transmitting area as the film is drawn continuously from the supply reel by the drawing reel, a quick starting high speed electric motor for driving the drawing reel support means to start quickly and draw film from a supply reel and to move past said ray transmitting area for continuous high speed exposure as it moves along, a brake for quickly stopping said rotative reel supports, a spring for moving said brake, and an electromagnet energizable for moving said brake in opposition to said spring so that the brake is quickly released when the motor is started and quickly applied when the motor is stopped.

2. A high speed shutterless oscillographic recording camera in accordance with claim 1 and further characterized by having a speed reduction connection between the motor and the drawing reel support means, said quick starting high speed electric motor being a series motor of a suitable size for starting so as to utilize substantially the full cross-sectional strength of the film for quick starting without impact, said brake being applied to retard the rotative supply reel support means and to thereby aid in retarding the drawing reel support means through the strength of the film stretched therebetween, and said brake being suitable to utilize substantially the full cross-sectional strength of the film in stopping.

3. In a high speed shutterless oscillographic recording camera, the combination of a rotative support for a film supply reel, a rotative support for a drawing reel for drawing film from said supply reel, protective enclosure means mounting and enclosing said rotative reel supports spaced in suitable cooperative positions, said enclosure means having a recording ray admitting window, guide means for guiding the unreeling film to move in a predetermined path adjacent said window for continuous exposure to a transmitted manifestation as the film passes to the drawing reel, a universal series electric motor, speed reduction means coupling said motor for quickly starting said drawing reel support without impact and for driving it at high speed to draw film past said window at high speed, and a control resistor connected in shunt with the armature of said motor to provide great starting torque and good running stability of said motor at all speeds, as the film is drawn past said window.

4. A high speed shutterless oscillographic camera in accordance with claim 3 and said motor being selected of a suitable size and so controlled as to utilize substantially the full cross-sectional strength of the film in starting in order to bring the film up to the desired speed of movement past the window in the shortest possible time interval.

5. A high speed shutterless oscillographic camera in accordance with claim 3 and having a brake to retard the rotative support of the supply reel, and means for automatically applying said brake to retard rotation of a film supply reel to make a squick stop when the electric driving motor is deenergized.

FREDERICK P. WARRICK.

REFERENCES CITED

The following references are of record in the file of this patent:

UNITED STATES PATENTS

| Number | Name | Date |
|---|---|---|
| 695,916 | Dickson | Mar. 25, 1902 |
| 1,097,211 | Bechstein | May 19, 1914 |
| 1,725,595 | Neil | Aug. 20, 1929 |
| 1,736,456 | Matthias | Nov. 19, 1929 |
| 1,993,884 | Hillery-Collings | Mar. 12, 1935 |
| 2,232,829 | Ross | Feb. 25, 1941 |
| 2,294,622 | Langberg et al. | Sept. 1, 1942 |
| 2,304,901 | Eisler | Dec. 15, 1942 |
| 2,320,350 | Del Riccio | June 1, 1943 |
| 2,351,399 | Caracciolo et al. | June 13, 1944 |
| 2,391,430 | Macek | Dec. 25, 1945 |
| 2,397,031 | Merritt et al. | Mar. 19, 1946 |
| 2,401,530 | Vought | June 4, 1946 |
| 2,409,597 | Sonne et al. | Oct. 15, 1946 |
| 2,417,076 | Hickman | Mar. 11, 1947 |
| 2,424,622 | McClure | July 29, 1947 |
| 2,458,882 | Stoner et al. | Jan. 11, 1949 |
| 2,478,681 | Beers | Aug. 9, 1949 |
| 2,483,147 | Mol | Sept. 27, 1949 |